US012361910B2

(12) United States Patent
Chen

(10) Patent No.: US 12,361,910 B2
(45) Date of Patent: Jul. 15, 2025

(54) DRIVER AND RELATED DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Weifeng Chen, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/569,239

(22) PCT Filed: Oct. 11, 2023

(86) PCT No.: PCT/CN2023/123946
§ 371 (c)(1),
(2) Date: Dec. 12, 2023

(87) PCT Pub. No.: WO2024/139522
PCT Pub. Date: Jul. 4, 2024

(65) Prior Publication Data
US 2025/0087181 A1 Mar. 13, 2025

(30) Foreign Application Priority Data

Dec. 29, 2022 (CN) .......................... 202211717077.1

(51) Int. Cl.
*G09G 5/00* (2006.01)

(52) U.S. Cl.
CPC .......... *G09G 5/003* (2013.01); *G09G 2310/08* (2013.01)

(58) Field of Classification Search
CPC ........................... G09G 5/003; G09G 2310/08
See application file for complete search history.

(56) References Cited

U.S. PATENT DOCUMENTS

2008/0025457 A1   1/2008  Pyeon
2008/0297500 A1*  12/2008 Kato ..................... G09G 3/3611
                                                          345/212
(Continued)

FOREIGN PATENT DOCUMENTS

CN          101021739 A      8/2007
CN          201584959 U      9/2010
(Continued)

OTHER PUBLICATIONS

International Search Report in International application No. PCT/CN2023/123946, mailed on Feb. 7, 2024.
(Continued)

*Primary Examiner* — Sejoon Ahn
(74) *Attorney, Agent, or Firm* — PV IP PC; Wei Te Chung

(57) ABSTRACT

A driver and a display device are provided. The driver includes a reset latch module, a first clock signal output module, and a second clock signal output module. The reset latch module receives and latches a system reset signal to continuously output a reset signal for a predetermined period of time, so that the reset signal can be completely output to the first clock signal output module and the second clock signal output module.

14 Claims, 3 Drawing Sheets

(56) References Cited

U.S. PATENT DOCUMENTS

| | | | |
|---|---|---|---|
| 2010/0033229 | A1 | 2/2010 | Irie |
| 2016/0293081 | A1* | 10/2016 | Kitsomboonloha .. G06F 3/0416 |
| 2016/0300546 | A1* | 10/2016 | Zheng .................. G09G 3/2096 |
| 2016/0379559 | A1* | 12/2016 | Yamaji ................. G09G 3/2096 |
| | | | 345/213 |
| 2021/0149434 | A1 | 5/2021 | Kong et al. |

FOREIGN PATENT DOCUMENTS

| | | |
|---|---|---|
| CN | 104242885 A | 12/2014 |
| CN | 104732948 A | 6/2015 |
| CN | 115938291 A | 4/2023 |

OTHER PUBLICATIONS

Written Opinion of the International Search Authority in International application No. PCT/CN2023/123946, mailed on Feb. 7, 2024.

\* cited by examiner

DRIVER AND RELATED DISPLAY DEVICE

CROSS REFERENCE TO RELATED APPLICATION

This application is a US national phase application based upon an International Application No. PCT/CN2023/123946, filed on Oct. 11, 2023, which claims the priority of Chinese Patent Application No. 202211717077.1, entitled "DRIVER AND RELATED DISPLAY DEVICE", filed on Dec. 29, 2022, the disclosures of which are incorporated herein by reference in its entirety.

FIELD OF THE DISCLOSURE

The present disclosure relates to a display technology, and more particularly, to a driver and a related display device.

BACKGROUND

Conventionally, the pixel architecture of the display panel mainly includes 1G1D (1 Gate 1 Data) architecture, Data Line Share (DLS) architecture, and Tri-gate architecture. For the DLS architecture and Tri-gate architecture, because the number of source driver chips is reduced by half or more compared with the 1G1D architecture, the load of the source driver chip is much larger than that of 1G1D, especially the load of the Tri-gate architecture is the largest. In addition, the working current is relatively large. Furthermore, due to the poor charging capability of the Tri-gate, the output of the source driver chip will be delayed as little as possible, which makes the Tri-gate itself more prone to electromagnetic radiation. In particular, due to the limited internal space of the source driver chip, the reset signal during power-up is different due to the differences in different traces. This makes the system reset incomplete, so that the electromagnetic radiation at some frequencies will be different after each reset, which results in verification failures.

SUMMARY

One objective of an embodiment of the present disclosure is to provide a driver and a display panel to alleviate the issue that makes the system reset incomplete due to the differences in different traces.

According to an embodiment of the present disclosure, a driver used in a display panel is disclosed. The driver comprises: a reset latch module, configured to receive and latch a system reset signal to continuously output a reset signal for a predetermined period of time; a first clock signal output module, configured to perform a reset operation according to the reset signal to output a first clock signal after the first clock signal output module is reset; and a second clock signal output module, configured to perform a reset operation according to the reset signal to output a second clock signal after the second clock signal output module is reset.

According to an embodiment of the present disclosure, a display panel is disclosed. The display panel comprises the above-mentioned driver.

Advantageous Effect

In contrast to the conventional art, the present disclosure proposes a driver and a display device. The driver includes a reset latch module, a first clock signal output module, and a second clock signal output module. The present disclosure utilizes a reset latch module to receive and latch the system reset signal to continuously output the reset signal for a predetermined period of time, so that the reset signal can be completely output to the signal interface terminal corresponding to the first clock signal output module and the second clock signal output module, so as to prevent the reset signal from being mistakenly inputted to any other terminal of the first clock signal output module and the second clock signal output module due to distortion caused by wiring difference, which may cause the first clock signal output of the first clock signal output module and the second clock signal output module to overlap and lead to electromagnetic radiation problems. In addition, by using the reset latch module, the reset lock module can be completely output to the first clock signal output module and the second clock signal output module, thereby realizing a more complete reset, therefore, the inconsistent electromagnetic radiations at certain frequencies due to the inconsistent reset status of each clock signal output module caused by the incomplete reset signal could be avoided. The display includes the driver.

DETAILED DESCRIPTION OF PREFERRED EMBODIMENTS

In order to make the purpose, technical solutions and effects of the present disclosure clearer and clearer, the present disclosure will be further described in detail below with reference to the accompanying drawings and examples. It should be understood that the specific embodiments described here are only used to explain the present disclosure and are not used to limit the present disclosure.

Figure 1A:
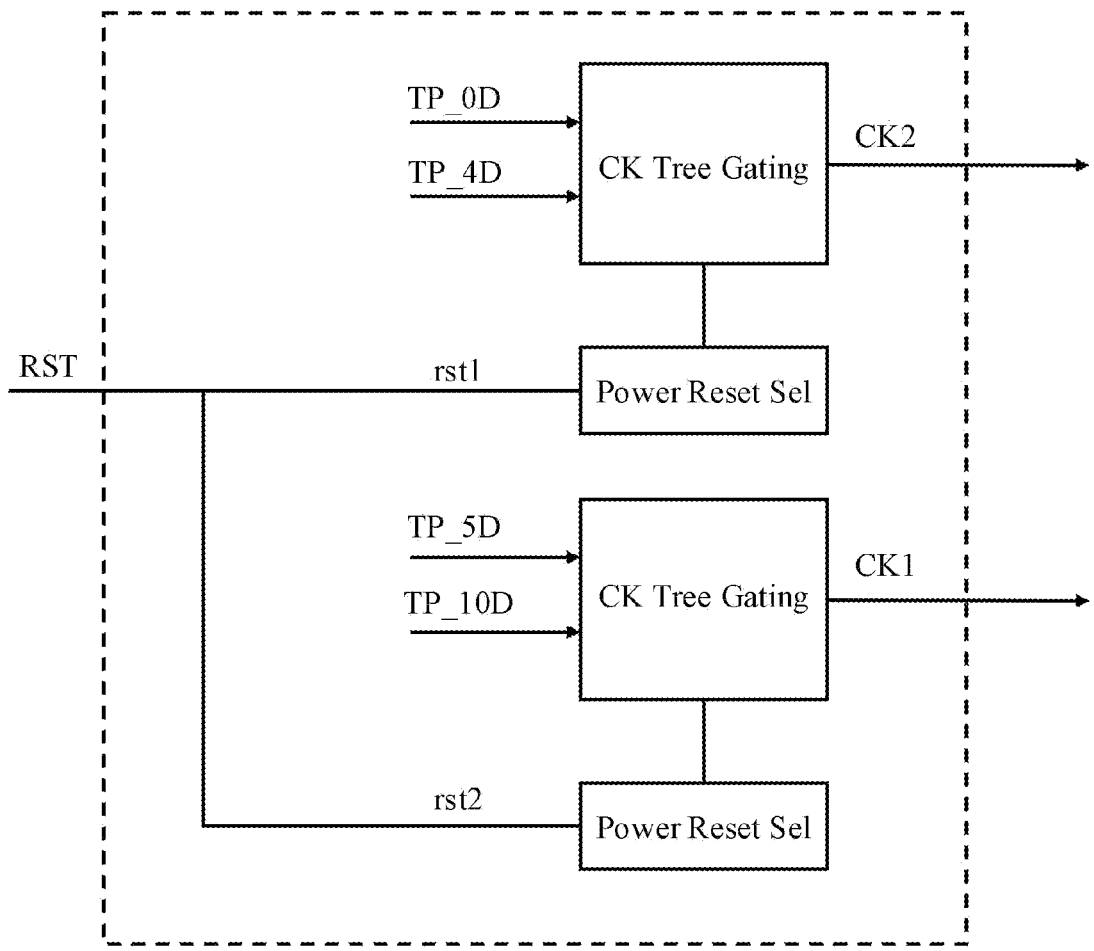
FIG. 1A is a diagram of a conventional driver.
Figure 1B:
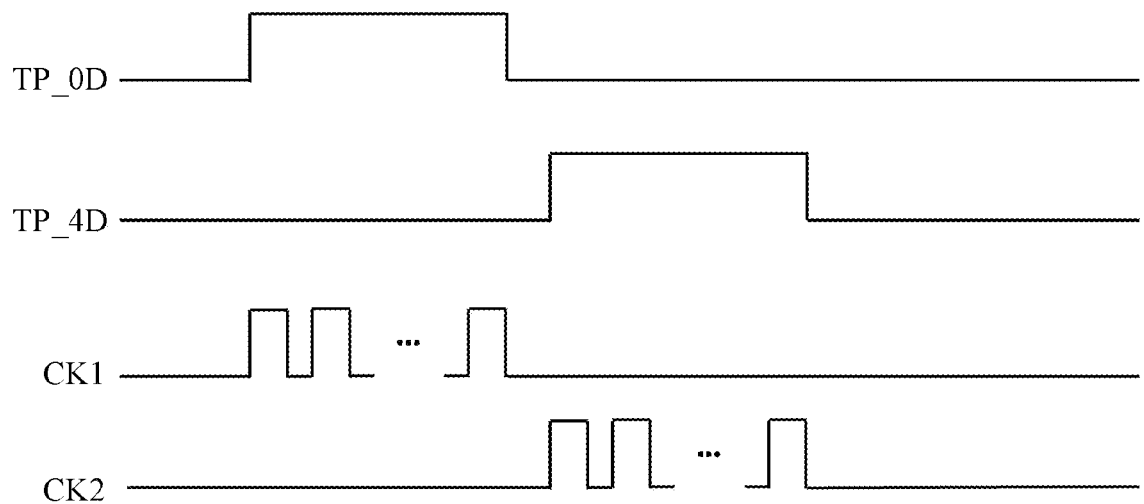
FIG. 1B is a timing diagram of the first clock signal and the second clock signal during a normal reset.
Figure 1C:
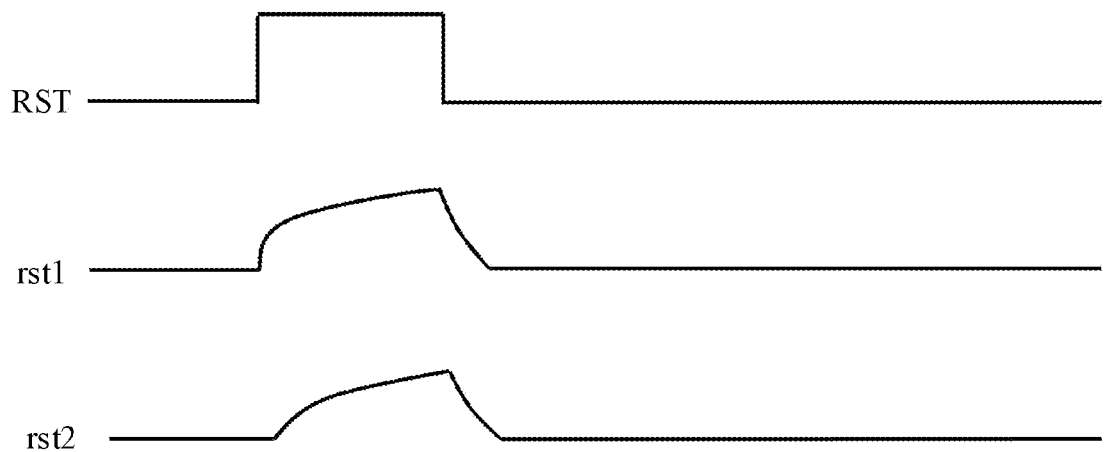
FIG. 1C is a timing diagram showing a distortion of the reset signal due to a difference in the traces.
Figure 1D:
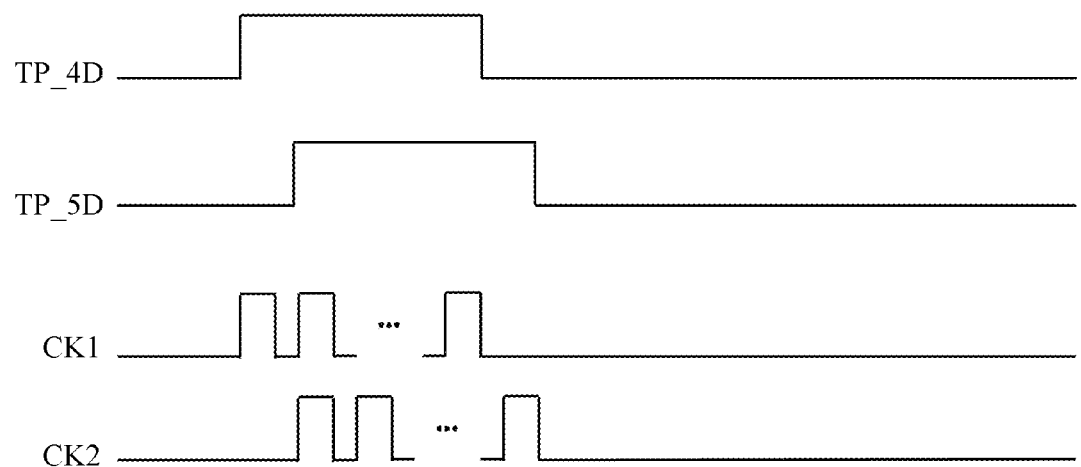
FIG. 1D is a timing diagram of the first clock signal and the second clock signal when the reset signal is not complete.

Specifically, as shown in FIGS. 1A-1D, FIG. 1A is a diagram of a conventional driver. FIG. 1B is a timing diagram of the first clock signal and the second clock signal during a normal reset. FIG. 1C is a timing diagram showing a distortion of the reset signal due to a difference in the traces. FIG. 1D is a timing diagram of the first clock signal and the second clock signal when the reset signal is not complete.

In a conventional driver, the system reset signal RST is inputted through the internal traces to the reset selection modules (i.e., the Power Reset Sel in FIG. 1A) to reset and restart the clock tree gatings (the CK Tree Gating shown in FIG. 1A) electrically connected to the reset selection modules. However, the system reset signal RST passes through different subsystems (not shown) before it reaches the reset selection module, and the difference between the traces and the resistance capacitance (RC) delay can cause the system reset signal RST to be distorted when it arrives the reset selection module (as shown by rst1 and rst2 in FIG. 1C). At this moment, if the distorted reset signal RST is used to reset the clock tree gating, the reset operation might be inconsistent and incomplete, which may cause the input of the clock tree gatings to be misaligned so that there is overlap between the multiple clock signals outputted by clock tree gatings. For example, if TP_0D and TP_4D should be the inputs, the timing diagrams of the output clock signal CK1 and the clock signal CK2 are shown in FIG. 1B. However, due to the inconsistent and incomplete reset operations, TP_4D and TP_5D may be misselected as inputs of the clock tree gatings and TP_4D and TP_5D differ by one delay unit. This results in the overlap of the output clock signal CK1 and the clock signal CK2, as shown in FIG. 1D. Because the energy is more concentrated on the overlapping part of the clock signal CK1 and the clock signal CK2, the electromagnetic radiation amplitude of a certain frequency (generally the rate divided by a multiple of 18) will become larger, causing the electromagnetic radiation problem. In addition, due to the incomplete reset of each time, the electromagnetic radiation amplitude of that frequency will have different degrees of deviation (difference of 10 dB or more), which may result in the failure of the electromagnetic radiation test.

Figure 2:
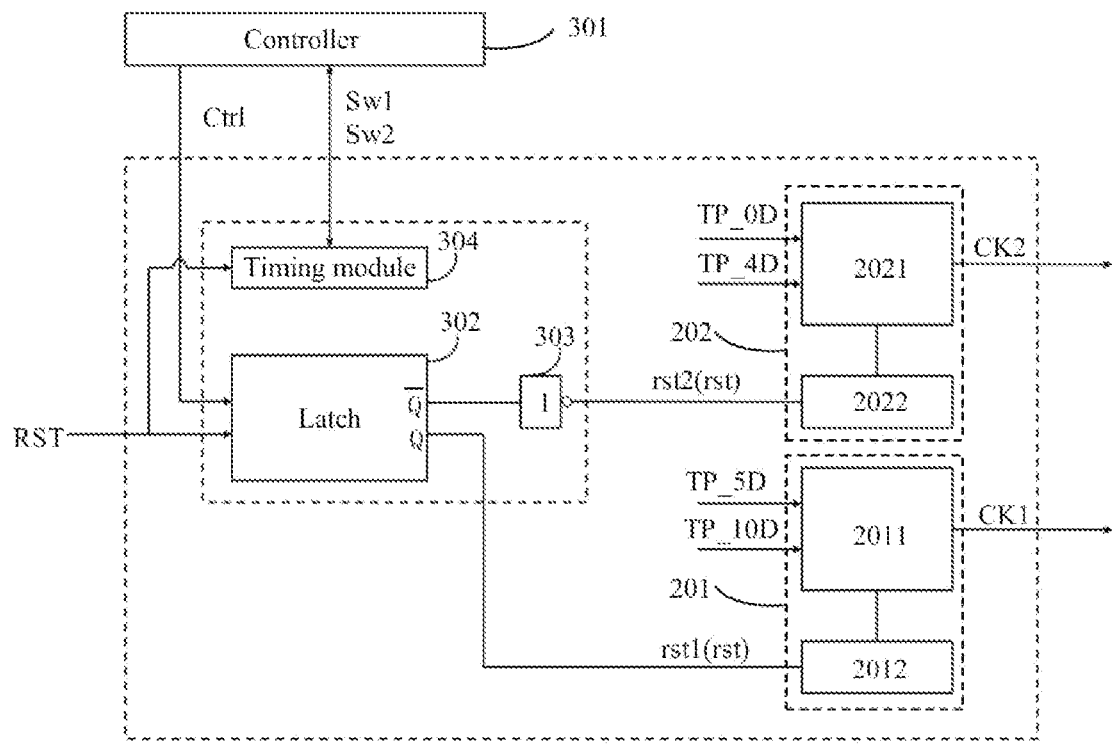
FIG. 2 is a diagram of a driver according to an embodiment of the present disclosure.
Figure 3:
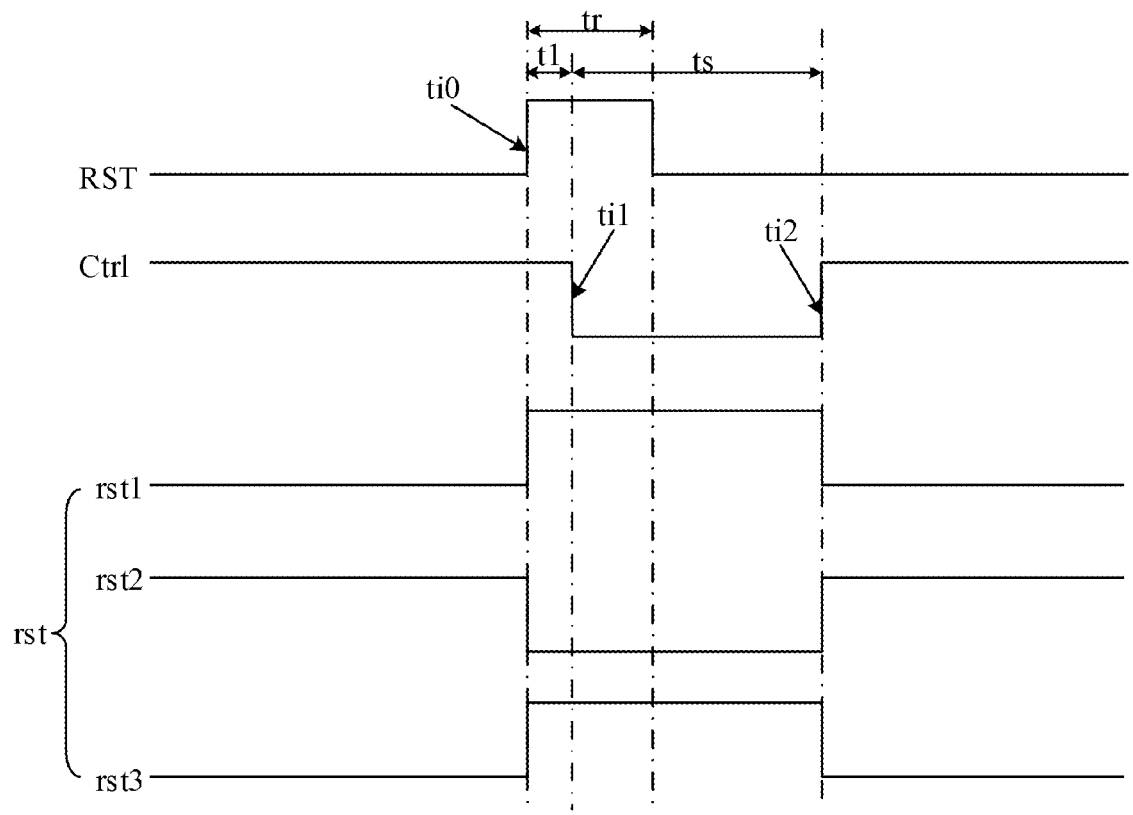
FIG. 3 is a timing diagram of a control signal, a system reset signal and a reset signal according to an embodiment of the present disclosure.

FIG. 2 is a diagram of a driver according to an embodiment of the present disclosure. FIG. 3 is a timing diagram of a control signal Ctrl, a system reset signal RST and a reset signal according to an embodiment of the present disclosure. According to an embodiment, a driver is disclosed. The driver is electrically connected with a display panel. The driver is used in the display panel, and the driver comprises a plurality of subsystems and a reset latch module.

The plurality of subsystems are configured to perform a reset operation according to the reset signal RST. Optionally, the plurality of the subsystems may include a clock signal output system. The clock signal output system is configured to output a clock signal.

Optionally, the clock signal output system comprises a plurality of clock signal output modules, and each clock signal output module is configured to be reset according to the corresponding reset signal RST and outputs a clock signal according to the corresponding signal after being reset.

The clock signal output modules may comprise a first clock signal output module 201 and a second clock signal output module 202. The first clock signal output module 201 is configured to perform a reset operation according to the reset signal rst, so as to output the first clock signal CK1 after the first clock signal output module 201 is reset (for example, the first clock signal output module 201 outputs the first clock signal CK1 according to the TP_0D and TP_4D). The second clock signal output module 202 is configured to perform a reset operation according to the reset signal rst, so that the second clock signal output module 202 outputs the second clock signal CK2 after the second clock signal output module 202 is reset (for example, the second clock signal output module 202 outputs the second clock signal CK2 according to the TP_5D and TP_10D), as shown in FIG. 2.

Optionally, each clock signal output module comprises a clock tree gating and the reset selection module electrically connected with the clock tree gating. Here, the clock tree gating is configured to correspondingly output a clock signal, and the reset selection module is configured to reset the corresponding clock signal output module according to the reset signal RST.

The first clock signal output module 201 comprises a first clock tree gating 2011 and a first reset selection module 2012 electrically connected with the first clock gating tree 2011. The first clock gating tree 2011 is configured to output the first clock signal CK1, and the first reset selection module 2012 is configured to reset the first clock signal output module 201 according to the reset signal, as shown in FIG. 2.

The second clock signal output module 202 comprises a second clock gating tree 2021 and a second reset selection module 2022 electrically connected with the second clock gating tree 2021. Here, the second clock gating tree 2021 is configured to output a second clock signal CK2, and the second reset selection module 2022 is configured to reset the second clock signal output module 202 according to the reset signal, as shown in FIG. 2.

The reset latch module is configured to receive and latch the system reset signal RST to continuously output the reset signal rst for the predetermined period of time ts, so that the reset signal rst can be completely output to the signal interface terminal corresponding to a plurality of clock signal output modules, thereby avoiding the reset signal RST from being misinput to the other terminals of the clock signal output modules due to distortion caused by the trace difference, which may cause the clock signals output from the plurality of clock signal output modules to overlap and the electromagnetic radiation problem. In addition, because the reset latch module can make the reset signal rst be completely output to a plurality of clock signal output modules, thereby realizing a relatively complete reset. Thus, it can also avoid the problem that the electromagnetic radiation is inconsistent at a certain frequency after each clock signal output module is restarted after being reset due to the incomplete reset signal rst. In this way, the stability of electromagnetic radiation could be ensured, the probability of electromagnetic radiation verification failure could be reduced, the driver could meet the product specification requirements, and the product competitiveness could be improved.

Specifically, as shown in FIG. 2, the reset latch module is configured to receive and latch the system reset signal RST to continuously output the reset signal rst to the first clock signal output module 201 and the second clock signal output module 202 for the predetermined period of time ts, so that the reset signal rst can be completely output to the first reset selection module 2012 and the second reset selection module 2022 to avoid the reset signal RST being misinput to the TP_4D and TP_due to distortion caused by trace difference, which in turn causes the first clock signal CK1 and the second clock signal CK2 to overlap and thus cause some electromagnetic radiation problems. In addition, because the reset signal RST can be completely output to the first reset selection module 2012 and the second reset selection module 2022 so that a more complete reset can be performed, the electromagnetic radiation inconsistence at certain frequencies caused by the inconsistent restart state of the first clock signal output module 201 and the second clock signal output module 202 due to the incomplete reset signal RST can also be avoided.

Optionally, the reset latch module comprises a controller 301 and a latch 302.

The controller 301 is configured to output the control signal Ctrl. Optionally, the controller 301 comprises a programmable logic gate array. Optionally, the controller 301 can be reused for other functions.

The latch 302 is configured to latch the system reset signal RST for the predetermined period of time ts according to the control signal Ctrl, so as to continuously output the reset signal rst to a plurality of clock signal output modules for the predetermined period of time ts, so that the reset signal RST can be completely output to a plurality of clock signal output modules to achieve a complete reset.

Optionally, the latch 302 includes a D latch or a gated latch.

Optionally, the control end of the latch 302 is electrically connected with the controller 301, the input end of the latch 302 is configured to receive the system reset signal RST, the first output terminal of the latch 302 is electrically connected to at least one reset selection module, and the second output NOT-terminal of the latch 302 is electrically connected with at least one reset selection module. Each of the reset selection modules is electrically connected to one of the first output terminal and the second output NOT-terminal of the latch 302. The first output terminal outputs the first reset signal rst1, and the second output NOT-terminal outputs a second reset signal rst2. The reset signal rst comprises the first reset signal rst1 and the second reset signal rst2. By using the controller 301 to control the latch 302 to latch the system reset signal RST to continuously output the reset signal rst to the plurality of clock signal output modules for the predetermined period of time ts, so that the reset signal RST can be completely output to the plurality of clock signal output modules to realize a complete reset.

If the first output terminal of the latch 302 is electrically connected to the first reset selection module 2012 and the second output NOT-terminal of the latch 302 is electrically connected to the second reset selection module 2022, the latch 302 is configured to latch the system reset signal RST for the predetermined period of time ts according to the control signal Ctrl, so as to continuously output the reset signal rst to the first reset selection module 2012 and the second reset selection module 2022 for the predetermined period of time ts. In this way, the reset signal rst can be completely output to the first clock signal output module 201 and the second clock signal output module 202, so that a complete reset is realized.

Optionally, when the control signal Ctrl is in a high voltage level, if the first reset signal rst1 output by the first output terminal of the latch 302 is consistent with the phase of the system reset signal RST, and the second reset signal rst2 output by the second output NOT-terminal of the latch 302 has a phase 180° different from the phase of the system reset signal RST, the reset latch module may also comprise an inverter 303. The input end of the inverter 303 is electrically connected with the second output NOT-terminal of the latch 302, and the output end of the inverter 303 is electrically connected with the corresponding reset selection module, so as to ensure that the reset signal received by the plurality of clock signal output modules electrically connected with the second output NOT-terminal can be used to perform the reset operation.

For example, the input end of the inverter 303 is electrically connected to the second output NOT-terminal of the latch 302, and the output end of the inverter 303 is electrically connected to the second reset selection module 2022, so that the second reset signal RST2 received by the second clock signal output module 202 becomes the third reset signal RST3 that can be used to perform the reset operation after the inverter 303, as shown in FIG. 3.

In order to ensure that the reset signal RST can be completely and effectively output to the plurality of clock signal output modules, the reset latch module further comprises a timing module 304. The timing module 304 is configured to output a first transition control signal Sw1 and a second transition control signal Sw2 to the controller 301, so that the controller 301 controls the control signal Ctrl to transit from a first voltage level to a second voltage level according to the first transition control signal Sw1 at a first timing ti1 and controls the control signal Ctrl to transit from the second voltage level to the first voltage level according to the second transition control signal Sw2 at a second timing ti2. Here, the first timing ti1 is located in an effective stage of the system reset signal RST, and a time difference between the second timing ti2 and the first timing ti1 is equal to the predetermined period of time ts. The first voltage level is higher than the second voltage level.

That is, when the control signal Ctrl is the first voltage level, the first reset signal rst1 output by the first output terminal of the latch 302 follows the state change of the system reset signal RST, so that the first reset signal rst1 remains the same as the system reset signal RST. The second reset signal rst2 becomes the third reset signal rst3 through the inverting operation of the inverter 303, so that the third reset signal RST3 remains the same as the system reset signal RST. When the control signal Ctrl is in the second voltage level, the first reset signal RST1 output at the first output terminal of the latch 302 and the second reset signal RST2 output at the second output NOT-terminal output no longer change with the system reset signal RST received at the input end. The first reset signal rst1 output by the first output terminal is consistent with the state when the control signal Ctrl is the first voltage level, and the second reset signal RST2 output by the second output NOT-terminal is consistent with the state when the control signal Ctrl is the first voltage level. Correspondingly, the third reset signal rst3 is consistent with the state when the control signal Ctrl is the first voltage level. Therefore, when the control signal Ctrl is the second level, the latching of the system reset signal RST can be realized.

When the control signal Ctrl is the first voltage level, the first reset signal rst1 output at the first output end of the latch 302 follows the state change of the system reset signal RST, and the second reset signal rst2 is inverted with the system reset signal RST. When the control signal Ctrl is the second voltage level, the first reset signal rst1, the second reset signal rst2 and the control signal Ctrl are consistent with the state when the control signal Ctrl is the first voltage level. Therefore, the first timing ti1 is located in the effective stage of the system reset signal RST. This could ensure that the effective pulse start time of the first reset signal RST1 and the third reset signal RST3 to be the same as the initial moment of the effective pulse start of the system reset signal RST. In addition, this could further ensure that when the control signal Ctrl is in the second voltage level, the first reset signal rst1 and the third reset signal RST3 still maintains at the voltage level of the effective pulse, so as to ensure that the corresponding clock signal output module receives a complete and effective reset signal.

Optionally, the predetermined period of time ts is longer than or equal to the time period tr corresponding to the effective phase of the system reset signal RST. The second timing ti2 corresponds to the invalid stage after the effective phase of the system reset signal RST. At the second timing ti2, the control signal Ctrl is switched from the second voltage level to the first voltage level, the first reset signal rst1 output by the first output terminal follows the system reset signal RST and thus enters the invalid stage, and the third reset signal rst3, obtained by inverting the second reset signal rst2 output by the second output NOT-terminal follows the system reset signal RST and thus also enters the invalid stage. Therefore, the predetermined period of time ts is equal to the time difference between the second timing ti2 and the first timing ti1.

Optionally, the timing module 304 is configured to output the first transition control signal Sw1 to the controller 301 after timing the first time period t1 from the initial timing ti0 of the effective period of the system reset signal RST, so that the first timing ti1 is located in the effective stage of the system reset signal RST.

Optionally, the timing module 304 may include a timer. The timer is configured to output the first transition control signal Sw1 to the controller after timing the first time period t1 from the initial timing ti0 of the effective period of the system reset signal RST.

Optionally, the timing module 304 comprises a counter. The counter is electrically connected to the controller 301 and the latch 302. The counter is configured to count from the initial timing ti0 when the system reset signal RST starts to be effective, so that when a product of a number of counts and a unit duration is equal to the first time period t1, the first transition control signal Sw1 is outputted to the controller. In this way, the first timing ti1 is located in the effective stage of the system reset signal RST. The counter counts according to the unit duration. That is, the counter is incremented by one for each unit duration.

Optionally, the counter is further configured to start counting from the first timing ti1, so that when the product of the number of counts and the unit duration is equal to the predetermined period of time ts, the second transition control signal Sw2 is output to the controller, so that the time difference between the second timing ti2 and the first timing ti1 is equal to the predetermined period of time ts.

Optionally, one unit duration is equal to the duration for the driver to transmit a data. Optionally, one unit duration is equal to 9 UI. The UI is inversely proportional to the transmission rate at which the driver transmits data.

Optionally, the predetermined period of time ts and the first time period t1 can be set according to the specifications of the registers. For example, if the register is an n-bit register, the predetermined period of time ts may be greater than or equal to the unit duration and less than or equal to 2n−1 times of the unit duration, and the first time period t1 may be greater than or equal to the unit duration and less than or equal to 2n−1 times of the unit duration.

Optionally, the first time period t1 is greater than or equal to the unit duration and less than or equal to 255 times of the unit duration, and the predetermined period of time ts is greater than or equal to the unit duration and less than or equal to 255 times of the unit duration.

Optionally, the counter can be multiplexed with a counter of the statistical operating clock signal inside the driver to reduce the device footprint.

According to an embodiment of the present disclosure, a display device is disclosed. The display device comprises the above-mentioned driver.

Optionally, the display device also includes a display panel electrically connected to the driver. The display panel includes a passive light-emitting display panel (such as a liquid crystal display panel, a quantum dot display panel), a self-luminous display panel (such as an organic light-emitting diode display panel, sub-millimeter light-emitting diode display panel, micro-light-emitting diode display panel).

The display devices include movable display devices (such as laptop computers, mobile phones, etc.), fixed terminals (such as desktop computers, TVs, etc.), measurement devices (such as sports bracelets, thermometers) etc.

This article uses specific examples to illustrate the principles and implementation methods of this application. The description of the above embodiments is only used to help understand the method and its core idea of this application.

At the same time, for those skilled in the art, there will be changes in the specific implementation and application scope based on the ideas of the present disclosure. In summary, the content of this description should not be understood as a limitation of the present disclosure.

What is claimed is:

1. A driver, used in a display panel, the driver comprising: a reset latch module, configured to receive and latch a system reset signal to continuously output a reset signal for a predetermined period of time; a first clock signal output module, configured to perform a reset operation according to the reset signal to output a first clock signal after the first clock signal output module is reset; and a second clock signal output module, configured to perform a reset operation according to the reset signal to output a second clock signal after the second clock signal output module is reset,
wherein: the first clock signal output module comprises:
a first clock tree gating, configured to output the first clock signal; and
a first reset selection module, electrically connected with the first clock tree gating, configured to reset the first clock signal output module according to the reset signal; and the second clock signal output module comprises:
a second clock tree gating, configured to output the second clock signal; and
a second reset selection module, electrically connected with the second clock tree gating, configured to reset the second clock signal output module according to the reset signal, and wherein the reset latch module comprises:
a controller, configured to output a control signal; and
a latch, having a control end electrically connected with the controller, an input end configured to receive the system reset signal, a first output terminal electrically connected with the first reset selection module, and a second output NOT end electrically connected with the second reset selection module, wherein the latch is configured to latch the system reset signal for the predetermined period of time according to the control signal so as to output the reset signal to the first reset selection module and the second reset selection module within the predetermined period of time.

2. The driver of claim 1, wherein the latch comprises a D latch or a gated latch.

3. The driver of claim 2, wherein the reset latch module further comprises:
an inverter, having an input end electrically connected with the second output NOT end of the latch, and an output end electrically connected with the second reset selection module.

4. The driver of claim 1, wherein the reset latch module further comprises: a timing module, configured to output a first transition control signal and a second transition control signal to the controller, so that the controller controls the control signal to transit from a first voltage level to a second voltage level according to the first transition control signal at a first timing and controls the control signal to transit from the second voltage level to the first voltage level according to the second transition control signal at a second timing; wherein the first timing is located in an effective stage of the system reset signal, and a time difference between the second timing and the first timing is equal to the predetermined period of time.

5. The driver of claim 4, wherein the timing module is configured to output the first transition control signal to the controller when the system reset signal is effective for a first period of time since an initial timing.

6. The driver of claim 5, wherein the timing module comprises:

a counter, electrically connected to the controller and the latch, configured to count from the initial timing when the system reset signal begins to be effective, so that when a product of a number of counts and a unit duration is equal to the first period of time, the first transition control signal is outputted to the controller.

7. The driver of claim 6, wherein the predetermine period of time is greater than or equal to one unit duration and less than or equal to 255 times of the unit duration.

8. A display device, comprising a driver for driving a display panel, the driver comprising: a reset latch module, configured to receive and latch a system reset signal to continuously output a reset signal for a predetermined period of time; a first clock signal output module, configured to perform a reset operation according to the reset signal to output a first clock signal after the first clock signal output module is reset; and a second clock signal output module, configured to perform a reset operation according to the reset signal to output a second clock signal after the second clock signal output module is reset, wherein: the first clock signal output module comprises: a first clock tree gating, configured to output the first clock signal; and a first reset selection module, electrically connected with the first clock tree gating, configured to reset the first clock signal output module according to the reset signal; and the second clock signal output module comprises: a second clock tree gating, configured to output the second clock signal; and a second reset selection module, electrically connected with the second clock tree gating, configured to reset the second clock signal output module according to the reset signal, and wherein the reset latch module comprises: a controller, configured to output a control signal; and a latch, having a control end electrically connected with the controller, an input end configured to receive the system reset signal, a first output terminal electrically connected with the first reset selection module, and a second output NOT end electrically connected with the second reset selection module, wherein the latch is configured to latch the system reset signal for the predetermined period of time according to the control signal so as to output the reset signal to the first reset selection module and the second reset selection module within the predetermined period of time.

9. The driver of claim 8, wherein the latch comprises a D latch or a gated latch.

10. The driver of claim 9, wherein the reset latch module further comprises:

an inverter, having an input end electrically connected with the second output NOT end of the latch, and an output end electrically connected with the second reset selection module.

11. The driver of claim 8, wherein the reset latch module further comprises: a timing module, configured to output a first transition control signal and a second transition control signal to the controller, so that the controller controls the control signal to transit from a first voltage level to a second voltage level according to the first transition control signal at a first timing and controls the control signal to transit from the second voltage level to the first voltage level according to the second transition control signal at a second timing; wherein the first timing is located in an effective stage of the system reset signal, and a time difference between the second timing and the first timing is equal to the predetermined period of time.

12. The driver of claim 11, wherein the timing module is configured to output the first transition control signal to the controller when the system reset signal is effective for a first period of time since an initial timing.

13. The driver of claim 12, wherein the timing module comprises:

a counter, electrically connected to the controller and the latch, configured to count from the initial timing when the system reset signal begins to be effective, so that when a product of a number of counts and a unit duration is equal to the first period of time, the first transition control signal is outputted to the controller.

14. The driver of claim 13, wherein the predetermine period of time is greater than or equal to one unit duration and less than or equal to 255 times of the unit duration.

* * * * *